United States Patent
Hesener et al.

(10) Patent No.: US 11,106,476 B2
(45) Date of Patent: Aug. 31, 2021

(54) HELPER SOFTWARE DEVELOPER KIT FOR NATIVE DEVICE HYBRID APPLICATIONS

(71) Applicant: VISA INTERNATIONAL SERVICE ASSOCIATION, San Francisco, CA (US)

(72) Inventors: Vincent Hesener, Dallas, TX (US); Thomas Purves, San Francisco, CA (US); Fayaz Mudnal, Foster City, CA (US); Anthony Kim, Dallas, TX (US); Feng Chi Wang, San Francisco, CA (US)

(73) Assignee: VISA INTERNATIONAL SERVICE ASSOCATION, San Francisco, CA (US)

( * ) Notice: Subject to any disclaimer, the term of this patent is extended or adjusted under 35 U.S.C. 154(b) by 263 days.

(21) Appl. No.: 16/210,864

(22) Filed: Dec. 5, 2018

(65) Prior Publication Data
US 2019/0179652 A1    Jun. 13, 2019

Related U.S. Application Data

(60) Provisional application No. 62/595,665, filed on Dec. 7, 2017.

(51) Int. Cl.
*H04L 29/06* (2006.01)
*G06F 9/445* (2018.01)
*H04L 29/08* (2006.01)
*G06Q 30/06* (2012.01)

(52) U.S. Cl.
CPC ...... *G06F 9/44526* (2013.01); *H04L 63/0428* (2013.01); *H04L 63/0861* (2013.01); *H04L 67/02* (2013.01); *H04L 67/146* (2013.01); *G06Q 30/0633* (2013.01)

(58) Field of Classification Search
CPC .. G06F 9/44526; G06F 9/451; G06F 9/45529; G06Q 30/0633; H04L 63/0428; H04L 63/0861; H04L 67/146; H04L 63/0815; H04L 67/02; H04W 12/0804
See application file for complete search history.

(56) References Cited

U.S. PATENT DOCUMENTS

2016/0099924 A1* 4/2016 Mehta ................ H04L 61/1523 726/7
2017/0061441 A1* 3/2017 Kamal ............. G06Q 20/40145

* cited by examiner

*Primary Examiner* — Olugbenga O Idowu
(74) *Attorney, Agent, or Firm* — Loeb & Loeb, LLP

(57) ABSTRACT

A helper SDK embedded in a native application performs local operations on behalf of a web application affiliated with the helper SDK. The helper SDK may perform security functions such as fingerprint or face biometric verifications as well as access device-specific hardware such as a camera or secure memory. The web application may use an OAuth technique for access and refresh tokens. In a transaction system, when a user is confirmed via the security function, order details are passed to the web application with a refresh token and ciphertext confirmation data is returned to the native application for completion of the transaction.

7 Claims, 3 Drawing Sheets

HELPER SOFTWARE DEVELOPER KIT FOR NATIVE DEVICE HYBRID APPLICATIONS

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A native application developed for local device execution may not include a full third party software developer kit (SDK) into the application because the SDK may both increase the size of the application and make updates to the native application more difficult to perform because of the multiple parties involved in an update. Alternatively, web application software developer kits that may be invoked by a native application are not able to access the full range of a host device's native capabilities due to limitations of functions exposed by commercial browsers.

SUMMARY

In an embodiment using a hybrid implementation of both native and web-based components, an application developer may include with the native code portion a small native SDK, or Helper SDK. This Helper SDK may have access to native device functions and in turn may communicate with a web application for expanded functionality. The Helper SDK may not significantly increase the size of its associated native application and because the focus of the helper SDK may support a limited number of native functions, the Helper SDK may have reduced maintenance requirements, requiring fewer updates compared to a full SDK. The native functions supported by the Helper SDK may, however, provide access to the affiliated web application for native device functions such as a camera, accelerometer, GPS, fingerprint reader, and secure memory. The Helper SDK may also create, modify, or delete cookies accessible by the web view application for passing state and other data to the web application.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Developers of native applications, that is, applications designed to be downloaded and executed on a local device, especially a smartphone, are often faced with difficult tradeoffs related to the use of a third party's software developer's kit (SDK). On one hand, the added features and functions supported by the SDK may be desirable in creating a differentiated product. On the other hand, are the negative effects of the increased size and maintenance efforts that go along with using the SDK. Some SDKs may be as large or larger than the application being developed and delivered. This may cause the final application use more memory and/or execute slowly than a competitor's application. Further, in an environment where important product and security updates are released on a regular basis, the application developer may become an unwilling middleman for software updates for the SDK itself.

An alternative to an embedded full SDK is an approach that uses a native application with no third party content but that makes a call to a browser to open a web page, or webview, to access and implement third party content. In this way the native application may be smaller and faster, with the third party content may be hosted at a traditional web server. Such a server-based implementation allows the third party web SDK to be updated independently of the native application, reducing the burden for updates on potentially millions of smartphones and other intelligent devices. With careful design, a user may not even realize that the user interface has been handed off from the native application to a web page.

One undesirable side effect of using a hybrid approach is that few if any native device functions are exposed by standard browsers. In such a case, the webview is unable to access functions, particularly hardware-based functions, such as a camera, fingerprint sensor or secure memory (i.e. a hardware security module or HSM) among others.

As disclosed herein, a third approach may use a small Helper SDK in the device that is linked to a Web SDK. This addresses the bulk and maintenance problems of local device content while providing access to device functions for the larger and separately maintainable Web SDK.

Figure 1:
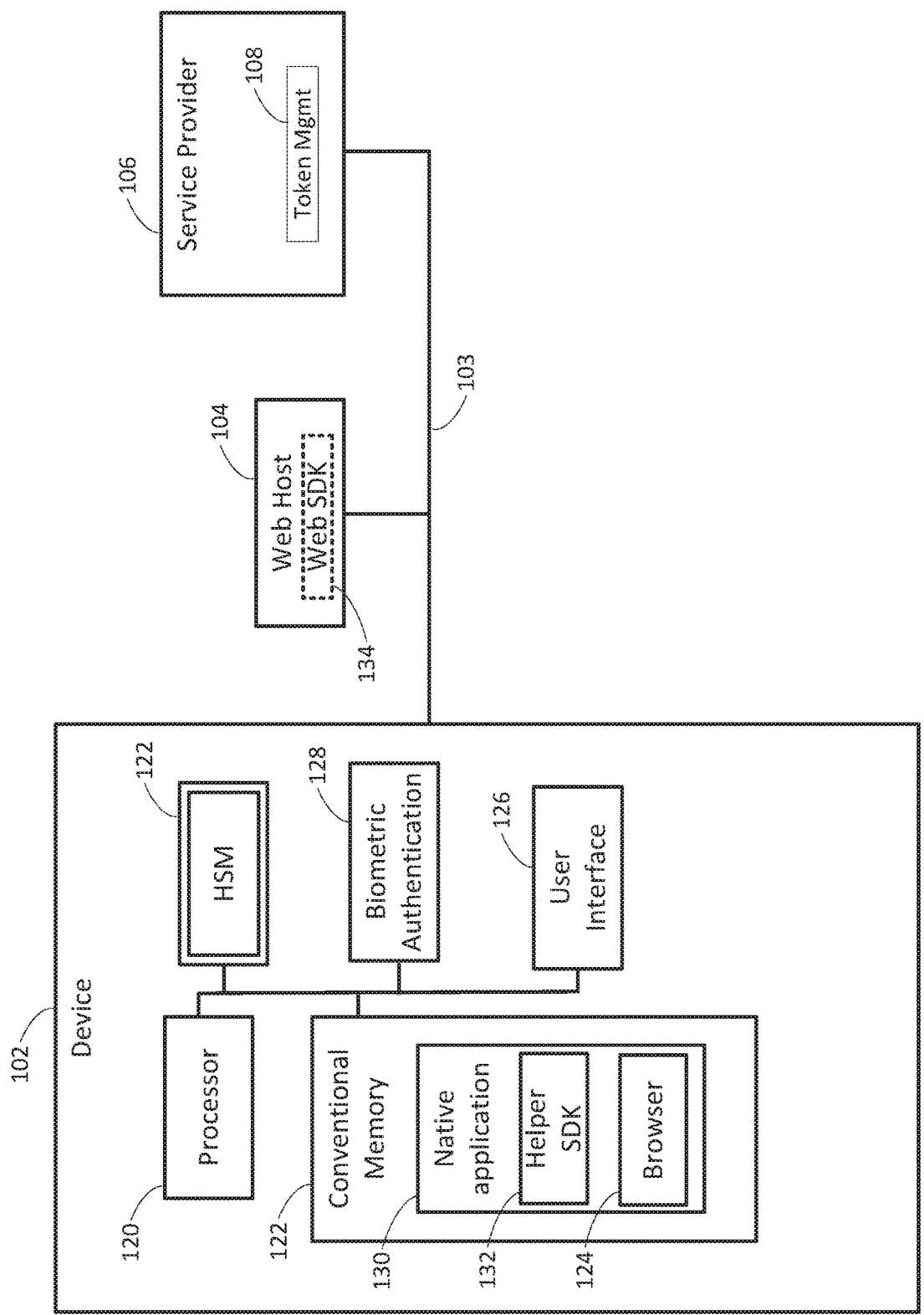
FIG. 1 is a block diagram depicting a device operating in a connected environment.

Turning to FIG. 1, a device 102, such as a smartphone, tablet, laptop, IoT device, etc., may be connected via a network 103, such as the Internet, to a web host 104 and a service provider 106. The web host 104 may be a one or more servers in any of a number of configurations and may host one or more web pages to a wide number of devices, including the device 102. The service provider 106 may provide security or convenience-related services on behalf of a user of the device 102. In an embodiment, the service provider 106 may support a platform for online payments including form filling and secure payment instrument storage. The service provider 106 may also support a form of single sign on using access and refresh tokens often referred to as OAuth via a token management function 108.

The simplified block diagram of FIG. 1 illustrates the device 102 having a processor 120 and a memory 122, a secure memory or HSM 122, a user interface 126 such as a touchscreen, and a biometric authentication device 128. In practice, the device 102 may include other components such as wired and wireless network communication equipment, speakers, haptic devices, etc., but for the sake of simplicity in focusing this disclosure, these components are not depicted. The HSM 122 may provide secure and tamper-resistant storage for data elements such as cryptographic keys and sensitive user data including biometric data like fingerprint, iris, retina, and/or face data. The HSM 122 may also include cryptographic computational capabilities including, but not limited to encryption, decryption, signing, verification, and key generation. In an embodiment, the HSM 122 may securely receive biometric data from the biometric device 128 and, when a match with known data is found, one or more elements of data in the HSM 122 may be made available to a calling function or a function of the HSM may be enabled, such as document signing using an internally stored key.

The memory 122 may include executable code and data including an operating system and utilities (not depicted) that may be used to control basic functions of the device 102 such as input/output functions, memory management, startup and shutdown sequences, etc. The memory 122 may also include a browser 124 that may be used to access web content, for example, web sites hosted by the web host 104.

By way of background, some software providers create applications or websites that provide data or services to a user of that data or service. For example, several companies provide maps via their web sites. In order to provide additional ways to access the map data, such a mapping company may provide code used to access the map data programmatically, so that another program can embed a feature of the map company's mapping system in the second company's applications. Often, the code provided by a data or service provider may be in the form of a software developers kit or SDK. The data or service provider may expose certain functions via an application program interface (API) and the SDK may provide a convenient framework of interfacing to those functions via the API.

A web software development kit (SDK) 134 is illustrated in FIG. 1 as part of the web host 104. When the browser 124 opens a page on the web host 104, the resulting page may be served, at least in part, by the Web SDK 134. In an embodiment, the Web SDK 134 may expose an API of the service provider 106 so that functionality supported by the service provider 106 may be accessed via one or more web sites supported by the web host.

A native application 130 may be any application that is downloaded to the device 102, in many cases by a user of the device, in order to gain a desired feature or function. As illustrated in FIG. 1, the native application 130, for example, a merchant's shopping application, may provide a user with the necessary graphical interface elements and server connectivity to view and make merchandise selections. In an embodiment, the browser 124 may be part of the native application 130 or may be a standalone application that may be called by the native application 130. The native application 130 may wish to provide support for making a payment after a purchase decision has been made, but as discussed above, the entire SDK for an embedded interface to a payment service, such as service provider 106, may be unacceptably large and/or may require updates on a different schedule than the native application 130. For these or other reasons, the developer of the native application 130 may not wish to include the entire payment service SDK. In a conventional scenario, that is, without the Helper SDK 132, the user may have to manually login to the service provider using an account identifier and a password for every transaction. Since password strength is a premium, the user may have to consult an outside source to recall the password or reset the password. This may prove a barrier to accessing the convenience and security afforded by using the service provider 106 for this process.

In accordance with the current disclosure, a Helper SDK 132 may be a small code set provided by the service provider 106. The same service provider 106 may also provide the Web SDK 134. The Helper SDK 132 may include native code that may access various hardware and software features of the device 102 that may not be exposed by the browser 124. To continue the payment example, the native application 130 may be at a point of checkout and proceeds to collect shipping and payment information. In this example, the ultimate goal may be to use the service provider 106 to expedite the form fill and payment instrument data entry for the merchant transaction. In an embodiment, the native application 124 may launch the Helper SDK 132, which in turn may launch the browser 124 pointed to the web host 104. After being instantiated at the web host 104, the Web SDK 134 may connect with already running instance of the Helper SDK 132. In another embodiment, the native application 130 may launch the browser session with the web host 104 and, after being instantiated, the Web SDK 134 may determine that the helper SDK 132 is available at the device 102 and may launch, or request the launch of, the Helper SDK 132. In either of these scenarios, or via other possible ways for the Web SDK 134 and the Helper SDK 132 to be launched, a discovery process allows each SDK 132, 134 to determine each other's presence and begin communicating.

In this way, the Web SDK 134 may be able to access those device features that are not exposed via the browser 124 in order to improve the user experience when completing a transaction using the service provider. An example of how this access may be used to improve a user's experience during the merchant checkout process involves the use of a OAuth process. In an embodiment, after an initial manual login, the user may only have to provide a simple biometric authentication to complete future transactions.

Figure 2:
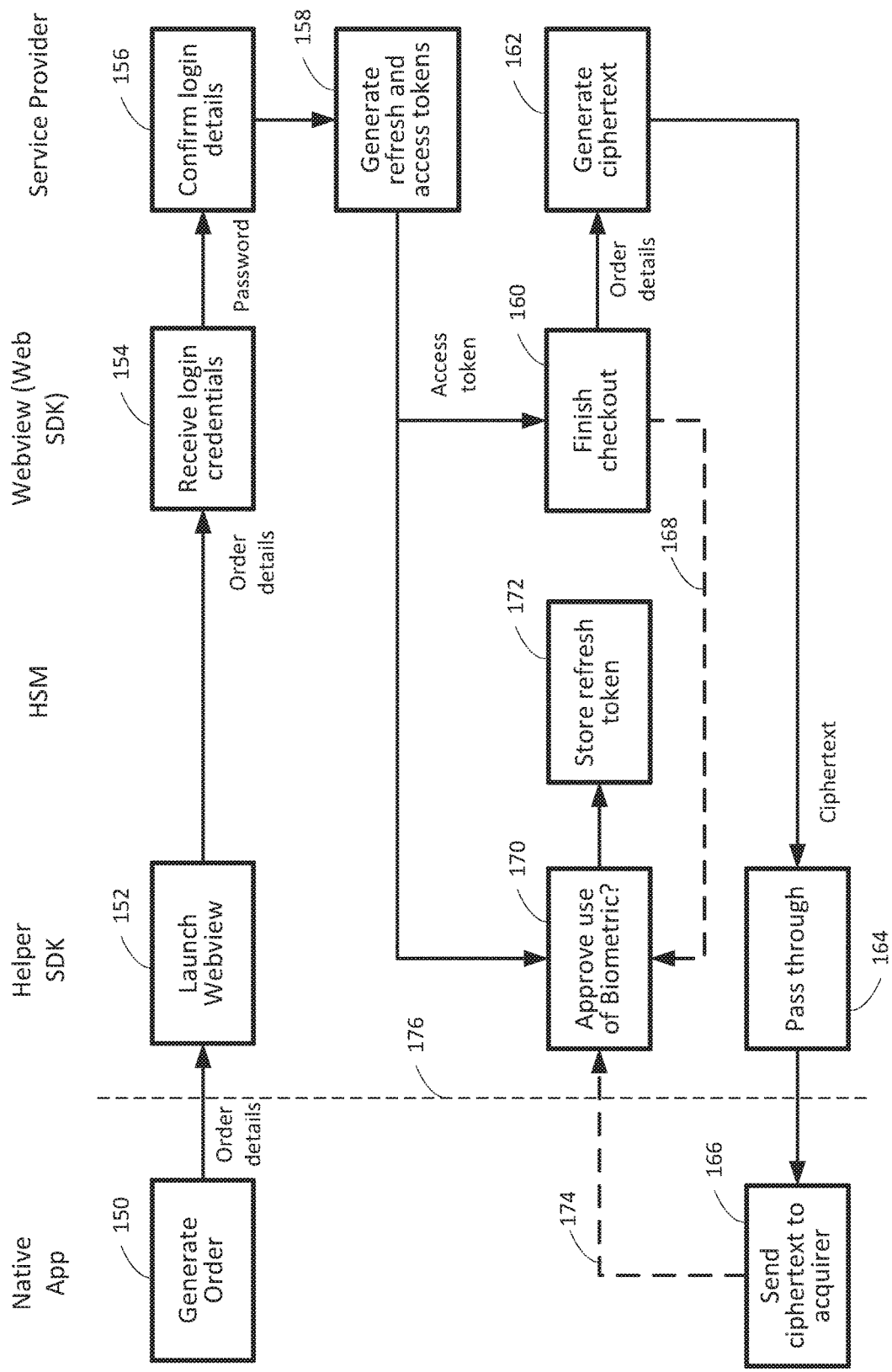
FIG. 2 is a flow chart illustrating operations between the device and other connected elements of FIG. 1 in accordance with the current disclosure.

Turning to FIG. 2, one exemplary process for using a Helper SDK 132 for a first time use with the service provider 106 may be disclosed. FIG. 2 is arranged as an entity diagram with vertical columns indicating an action taken by that entity. At block 150, an order may be generated by the native application 130. The order details, such as item (SKU number) price, and merchant, may be passed to the Helper SDK 132. In this embodiment, the Helper SDK 132 may in turn launch a webview in the browser 124 calling the Web SDK 134. The order details may be passed to the webview/Web SDK at block 154. Because, in this illustration, the user has not signed into the service provider 106 before via this channel, the user enters login credentials including a password. At block 158, the service provider 106 may, upon approval of the login credentials generate refresh and access tokens at a token manager 108. In a OAuth-type embodiment, the access token may be used for short term access to a service, in this case the service provider 106. The refresh token may be securely stored at the device 102 for use in subsequent logins as will be described below. The access token may be provided to the webview 134 at block 160, where the user may confirm order details, shipping address, and select a payment instrument. The confirmed order details and the access token may be provided back to the service provider 106 at block 162. The service provider 106 may confirm the payment instrument's validity and generate a transaction with an issuer or other upstream processor (not depicted). Upon approval, the service provider 106 may generate a cryptogram or ciphertext that includes the payment instrument, approval codes if any, and other order details for use by the merchant in completing the transaction. The ciphertext may be passed to the Helper SDK at block 164 which may be passed to the merchant via the native application 130 at block 166. The merchant may present the ciphertext to an acquirer as proof of an authorized transaction for eventual settlement after the merchant provides the goods or service associated with the transaction. In an embodiment, the ciphertext may be passed directly to the native application 130.

In an embodiment, when the access token is passed to the webview 134, the refresh token may be passed to the Helper SDK 132. The refresh token may be held at the Helper SDK for a subsequent event. In one embodiment, the subsequent event may be the user approval of the final transaction at block 160. A signal 168 may be passed to the Helper SDK which may prompt the user at block 170 to authorize future transactions to be approved using a biometric authentication, such as a fingerprint or face recognition. If approved, the refresh token may be stored in the HSM 122 so that the refresh token is only available after a biometric authentication. In another embodiment, the subsequent event triggering the user approval for biometric use may be the receipt of the ciphertext by the merchant/native application at block 166, as indicated by signal 174.

The dashed line 176 indicates a trust boundary between the native application 130 and the other entities involved in the transaction. Of note is that the only data that crosses the trust boundary are the order details in one direction and the ciphertext in the other direction. No sensitive user data, financial instrument information, payment details or the like are ever passed in the clear across the trust boundary.

Figure 3:
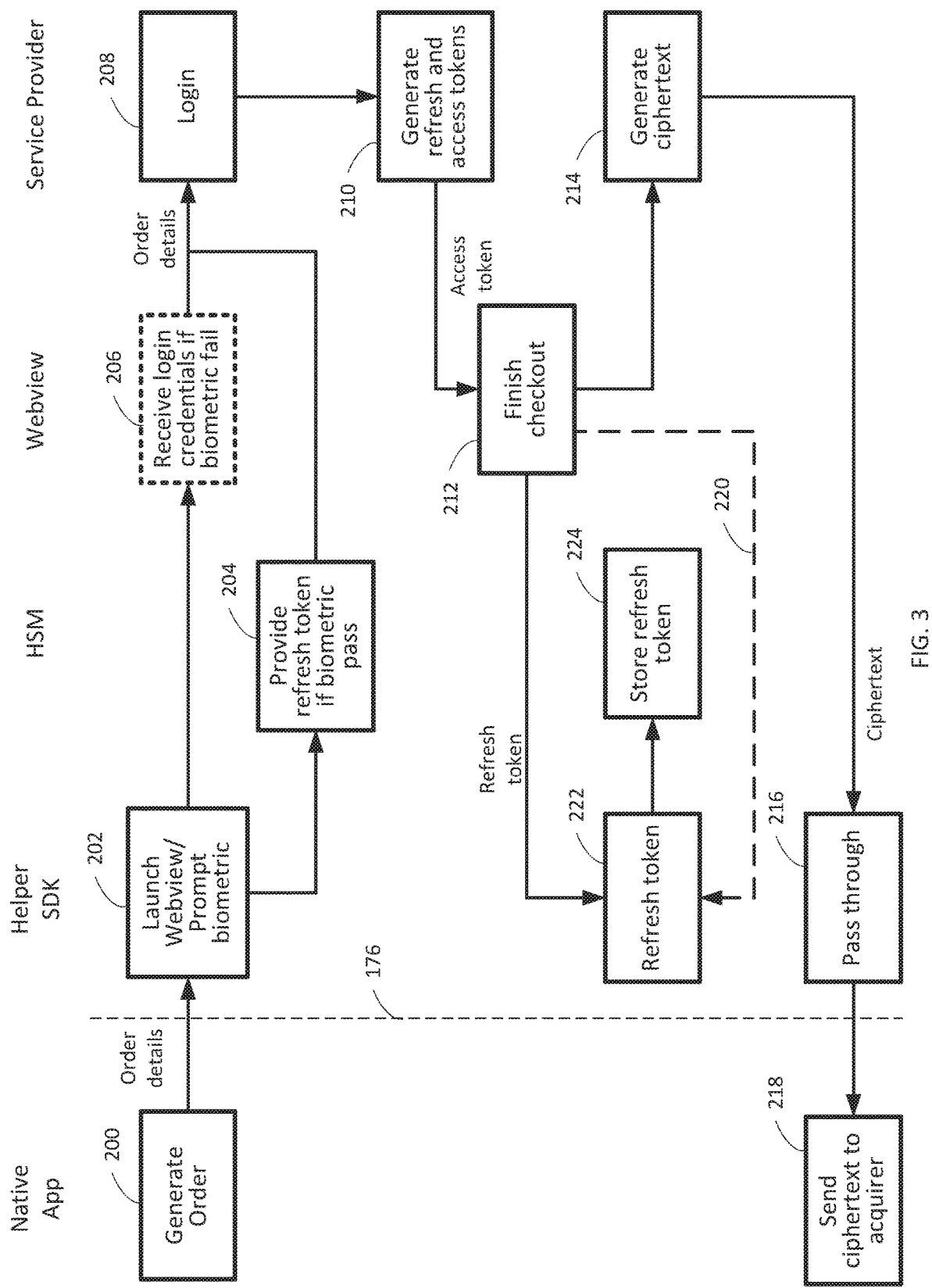
FIG. 3 is a flow chart illustrating a second aspect of the operations between the device and other connected elements of FIG. 1 in accordance with the current disclosure.

FIG. 3 may illustrate a subsequent transaction after the use of a biometric authentication is approved. As above, an order may be generated at the native application 130 as shown at block 200. The Helper SDK 132 may then at block 202 prompt the user to provide a biometric identifier, such as a fingerprint, using the biometric authentication device 128. If the biometric confirmation fails, the user may be passed to a webview at block 206 to authenticate to the service provider 106 as above. However, if the biometric credential is accepted, at block 204, the refresh token may be released from the HSM 122 and passed to the service provider 106 at block 208. The refresh token may be used at block 208 to trigger, at block 210, generation of a new access token, and in an embodiment, a new refresh token. For example, in an embodiment, the access token may be valid for 15 minutes while the refresh token may be valid for 6 months.

As above, the access token may be used at block 212 by the webview 134 for completion of the order details. The service provider may generate, at block 214, the ciphertext of the transaction which may be passed to the Helper SDK 216 at block 216 and on to the native application 130 at block 218. The transaction may be completed as above by the merchant presenting the ciphertext to an acquirer or other downstream processor.

Returning to block 212, the refresh token may be returned to the Helper SDK 132 at block 222 and, responsive to a signal 220 from the webview 134, may be stored in the HSM 224 for use in authenticating a subsequent transaction. If the next transaction is beyond the expiration of the refresh token, the user may have to re-authenticate using a password following the flow of FIG. 2.

In an embodiment, the order data in either FIG. 2 or FIG. 3 may include a device reference or hardware identifier of the device 102 so that the token manager 108 may create a binding between the refresh token and the device 102. In this way, the refresh token may only be accepted when it is received from the device for which it was created.

In another aspect, the Helper SDK 132 may create, modify, or delete local cookies on the device 102. Cookies may be used in browser session to send information to a web server, for example, state or reference information about a previous web session, such as a shopping cart pointer, a preference setting, etc. The Helper SDK 132 may use information gathered during, or even apart from, one of the sessions illustrated in FIG. 2 and FIG. 3 and reflect that information in a cookie. This may involve modifying a current cookie with updated information, creating a new cookie, or even deleting a cookie which may contain outdated information. In a current session, the cookie information may be used to relay updated information to the webview/Web SDK 134. When a cookie is created or modified when no session is active, the cookie will relay information upon startup of a subsequent web session.

A technical effect of the system is a hybrid channel implementation that allows an application developer to incorporate the advantages of small native applications with the robustness of a Web SDK that can access previously hidden features of the device 102, such as a camera or fingerprint reader. The automatic discovery of the Helper SDK by the Web SDK removes the need for user interaction or hard coded links in the native application 130.

A system and method in accordance with the current disclosure benefits both application developers and users alike. The application developer can develop smaller, more maintainable code without sacrificing access to features that users have come to expect. A user benefits by having higher featured applications which do not tax the limited memory of a device, such as a smartphone. The secondary benefit to a user of an implementation as discussed above is that transaction security is improved through the use of the 0Auth mechanism because the user no longer has to remember passwords but rather can rely on a biometric identifier to reduce fraudulent transactions even if the device 102 is lost or stolen.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

We claim:

1. A method comprising:
   launching a helper SDK from within a native application executing on a device, the helper SDK outside a trust barrier of the native application;
   launching a webview via the helper SDK;
   providing a login credential from the webview to a service provider;
   responsive to acceptance of the login credential by the service provider, receiving, at the webview, a refresh token and an access token from the service provider, the access token used by the webview in completing a transaction;
   receiving at the helper SDK from the webview, the refresh token;
   storing, via the helper SDK, the refresh token in a secure memory of the device; and
   subsequent to storing the refresh token in the secure memory and corresponding to subsequent activity initiating, via the helper SDK, a biometric verification of a user, responsive to a successful biometric verification of the user, receiving the refresh token from the secure memory, sending the refresh token to the service provider, receiving at the webview a second access token from the service provider corresponding to the subsequent activity, receiving, at the helper SDK, a second refresh token corresponding to the second activity, and storing, via the helper SDK, the second refresh token in the secure memory.

2. The method of claim 1, further comprising binding the refresh token to the device using a device identifier captured by the helper SDK.

3. The method of claim 2, further comprising verifying a refresh token binding matches the device from which the refresh token is received.

4. The method of claim 1, further comprising generating, via the SDK, a cookie accessible by the webview.

5. The method of claim 4, wherein generating the cookies comprises generating, via the helper SDK, the cookie at a time when no webview is active.

6. The method of claim 4, further comprising deleting the cookie via the helper SDK.

7. The method of claim 4, further comprising modifying the cookie via the helper SDK at a time when no webview is active.

* * * * *